(12) United States Patent
Bulut et al.

(10) Patent No.: US 9,451,383 B2
(45) Date of Patent: Sep. 20, 2016

(54) METHOD AND APPARATUS FOR MAINTAINING ONE OR MORE COMMUNICATION SESSIONS

(75) Inventors: Serdar Bulut, Hayward, CA (US); David Berkowitz, Redwood City, CA (US); Wei-Meng Chee, Sunnyvale, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 92 days.

(21) Appl. No.: 13/278,981

(22) Filed: Oct. 21, 2011

(65) Prior Publication Data

US 2013/0103844 A1 Apr. 25, 2013

(51) Int. Cl.
G06F 15/16 (2006.01)
H04W 4/00 (2009.01)
H04L 29/08 (2006.01)

(52) U.S. Cl.
CPC ............ H04W 4/003 (2013.01); H04L 67/145 (2013.01)

(58) Field of Classification Search
None
See application file for complete search history.

(56) References Cited

U.S. PATENT DOCUMENTS

| | | | |
|---|---|---|---|
| 7,545,741 B1* | 6/2009 | Manickavasagam et al. | 370/230 |
| 7,672,264 B2* | 3/2010 | Babin | 370/318 |
| 7,774,007 B2* | 8/2010 | Backholm et al. | 455/466 |
| 8,103,906 B1* | 1/2012 | Alibakhsh et al. | 714/13 |
| 2002/0099821 A1* | 7/2002 | Hellerstein | H04L 12/2602 709/224 |
| 2005/0089023 A1 | 4/2005 | Barkley et al. | |
| 2005/0188098 A1 | 8/2005 | Dunk | |
| 2006/0059230 A1 | 3/2006 | Dykas et al. | |
| 2006/0200527 A1* | 9/2006 | Woods | G06Q 10/107 709/206 |
| 2007/0043850 A1* | 2/2007 | Scheering | H04L 29/06 709/224 |
| 2007/0140193 A1* | 6/2007 | Dosa et al. | 370/338 |
| 2007/0156870 A1* | 7/2007 | McCollum | H04L 41/069 709/223 |
| 2007/0298848 A1 | 12/2007 | Babin | |
| 2009/0088108 A1 | 4/2009 | Granlund et al. | |

(Continued)

FOREIGN PATENT DOCUMENTS

| | | | |
|---|---|---|---|
| EP | 2 472 963 A1 | 7/2012 | |
| WO | WO 2009053522 A1 * | 4/2009 | ............ H04W 52/02 |

OTHER PUBLICATIONS

Geier, Jim, "802.11 Beacons Revealed", Oct. 31, 2002 from http://www.wi-fiplanet.com/tutorials/article.php/1492071, 4 pages.*
International Search Report for PCT/FI2012/050939 dated Nov. 5, 2012, pp. 1-6.

(Continued)

Primary Examiner — Farid Homayounmehr
Assistant Examiner — Maung Lwin
(74) Attorney, Agent, or Firm — Ditthavong & Steiner, P.C.

(57) ABSTRACT

An approach is provided for establishing one or more communication sessions in a cloud computing environment and maintaining the establishment of the one or more communication sessions while managing system resource and power resource consumption. The approach involves causing, at least in part, an establishment of one or more communication sessions between at least one device and one or more other devices, wherein the communication sessions convey, at least in part, one or more notification messages. The approach also involves processing and/or facilitating a processing of device resource information, device capability information, network resource information, or a combination thereof to determine one or more parameters for generating one or more heartbeat signals to maintain the one or more communication sessions.

18 Claims, 14 Drawing Sheets

(56) References Cited

U.S. PATENT DOCUMENTS

| | | | |
|---|---|---|---|
| 2010/0217837 A1* | 8/2010 | Ansari et al. | 709/218 |
| 2010/0228863 A1* | 9/2010 | Kawauchi | 709/227 |
| 2010/0325306 A1 | 12/2010 | Vimpari et al. | |
| 2011/0078489 A1* | 3/2011 | Song et al. | 714/3 |
| 2011/0103576 A1* | 5/2011 | Partington et al. | 379/419 |
| 2011/0252071 A1* | 10/2011 | Cidon | 707/802 |
| 2012/0008536 A1* | 1/2012 | Tervahauta et al. | 370/311 |
| 2012/0226663 A1* | 9/2012 | Valdez Kline et al. | 707/640 |

OTHER PUBLICATIONS

M. Demmer et al., "Delay Tolerant Networking TCP Convergence Layer Protocol", Internet-Draft, Helsinki University of Technology, Nov. 3, 2008. pp. 1-23.

Written Opinion for PCT/FI2012/050939 dated Nov. 5, 2012, pp. 1-8.

European Office Action for related European Application No. 12841041.2-1870 dated May 4, 2015, 7 pages.

\* cited by examiner

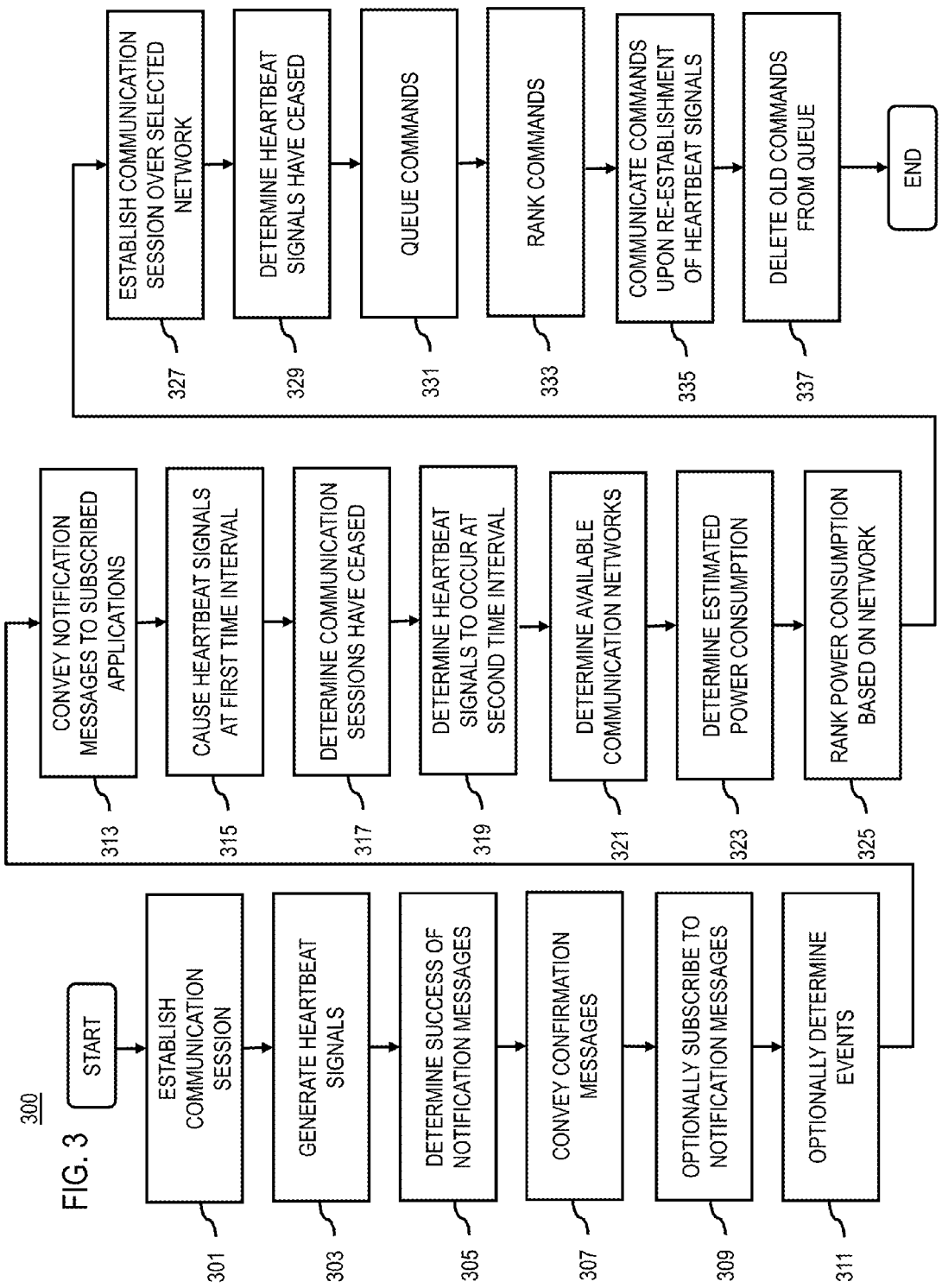

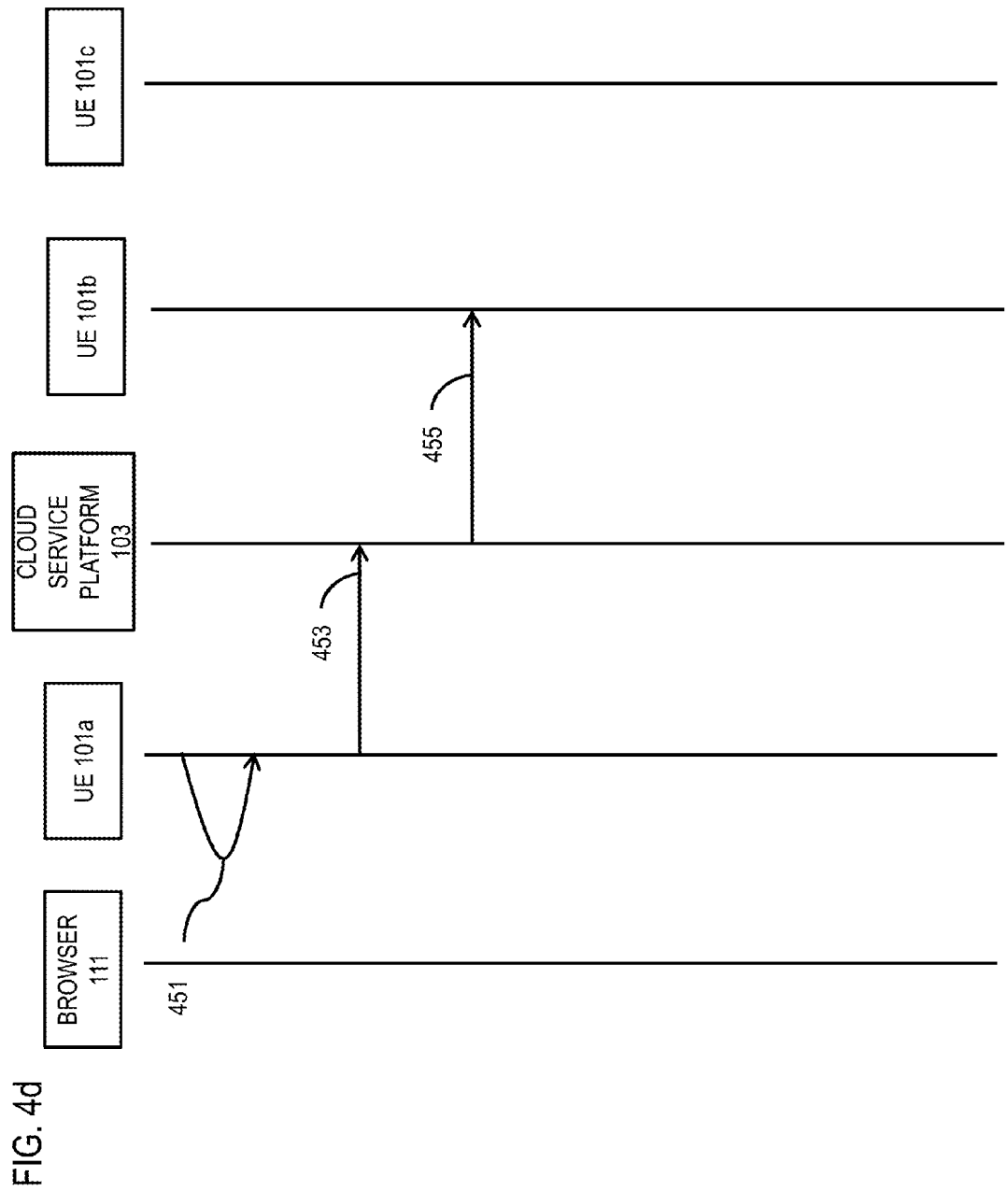

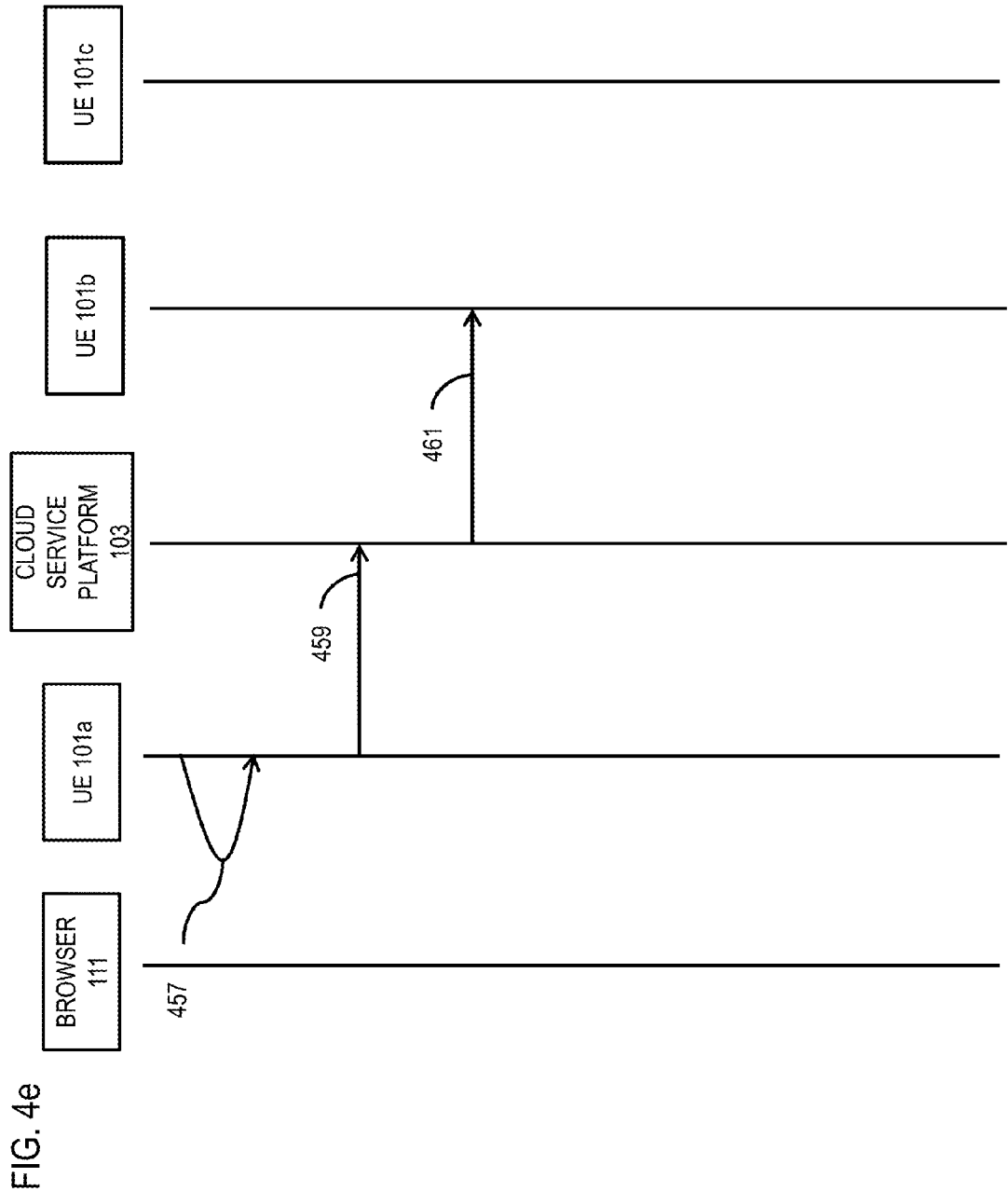

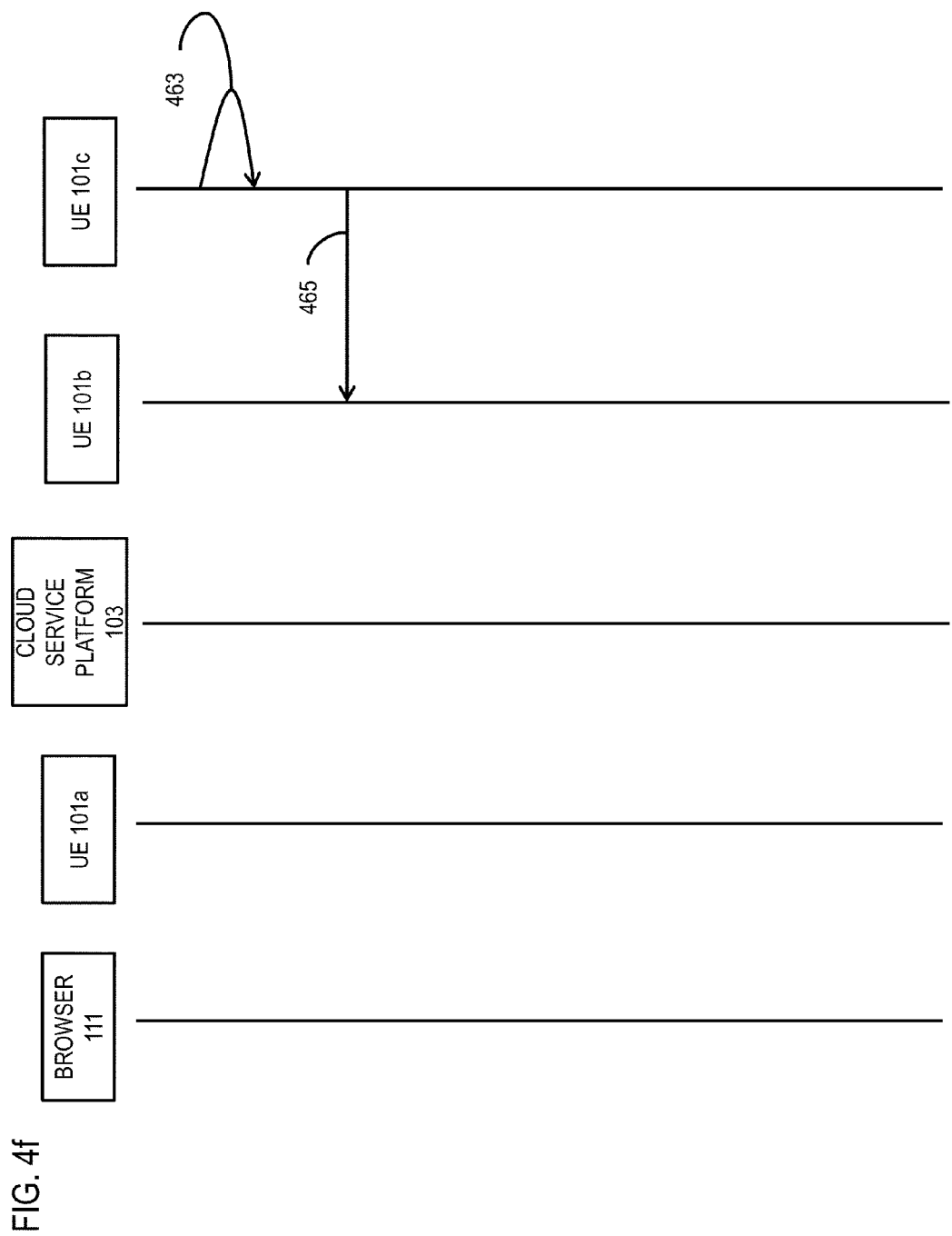

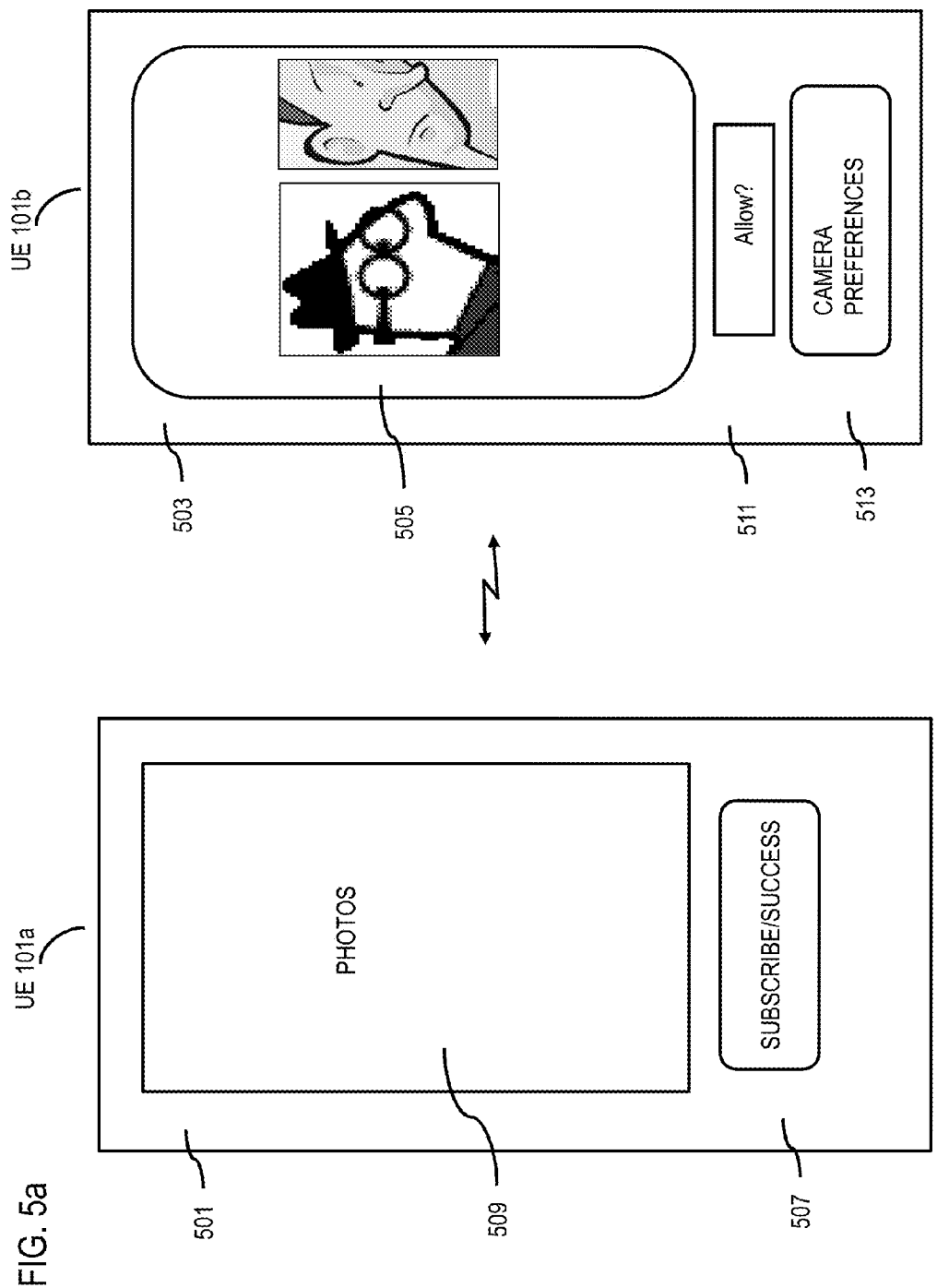

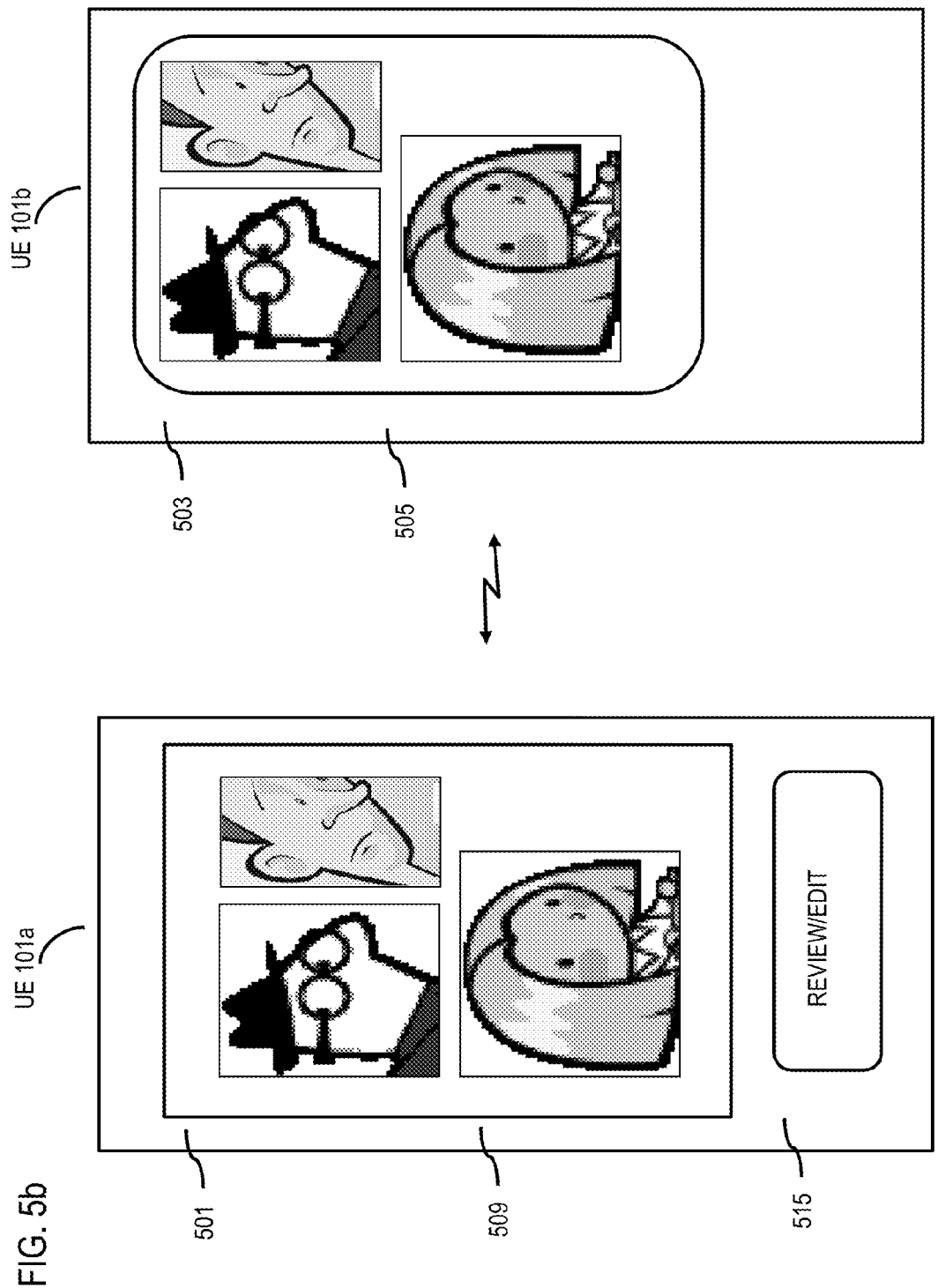

METHOD AND APPARATUS FOR MAINTAINING ONE OR MORE COMMUNICATION SESSIONS

BACKGROUND

Service providers and device manufacturers (e.g., wireless, cellular, etc.) are continually challenged to deliver value and convenience to consumers by, for example, providing compelling network services. One area of interest relates to cloud computing services. For example, users may have multiple devices that are associated with a cloud computing environment. The devices may have established communication sessions through which messages may be sent. Conventional cloud computing service providers are continually challenged with the task of maintaining the established communication sessions while conserving power and/or system resources of the various devices.

SOME EXAMPLE EMBODIMENTS

Therefore, there is a need for an approach for establishing one or more communication sessions in a cloud computing environment and maintaining the establishment of the one or more communication sessions while managing system resource and power resource consumption.

According to one embodiment, a method comprises causing, at least in part, an establishment of one or more communication sessions between at least one device and one or more other devices, wherein the communication sessions convey, at least in part, one or more notification messages. The method also comprises processing and/or facilitating a processing of device resource information, device capability information, network resource information, or a combination thereof to determine one or more parameters for generating one or more heartbeat signals to maintain the one or more communication sessions.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, an establishment of one or more communication sessions between at least one device and one or more other devices, wherein the communication sessions convey, at least in part, one or more notification messages. The apparatus is also caused to process and/or facilitate a processing of device resource information, device capability information, network resource information, or a combination thereof to determine one or more parameters for generating one or more heartbeat signals to maintain the one or more communication sessions.

According to another embodiment, a computer-readable storage medium carries one or more sequences of one or more instructions which, when executed by one or more processors, cause, at least in part, an apparatus to cause, at least in part, an establishment of one or more communication sessions between at least one device and one or more other devices, wherein the communication sessions convey, at least in part, one or more notification messages. The apparatus is also caused to process and/or facilitate a processing of device resource information, device capability information, network resource information, or a combination thereof to determine one or more parameters for generating one or more heartbeat signals to maintain the one or more communication sessions.

According to another embodiment, an apparatus comprises means for causing, at least in part, an establishment of one or more communication sessions between at least one device and one or more other devices, wherein the communication sessions convey, at least in part, one or more notification messages. The apparatus also comprises means for processing and/or facilitating a processing of device resource information, device capability information, network resource information, or a combination thereof to determine one or more parameters for generating one or more heartbeat signals to maintain the one or more communication sessions.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3 is a flowchart of a process for establishing one or more communication sessions in a cloud computing environment and maintaining the establishment of the one or more communication sessions while managing system resource and power resource consumption, according to one example embodiment;

FIGS. 4a-4f are diagrams of sequence diagrams illustrating the processes of FIG. 3, according to various example embodiments;

FIGS. 5a and 5b are diagrams of user interfaces utilized in the processes of FIG. 3, according to various example embodiments;

DESCRIPTION OF SOME EMBODIMENTS

Examples of a method, apparatus, and computer program for establishing one or more communication sessions in a cloud computing environment and maintaining the establishment of the one or more communication sessions while managing system resource and power resource consumption are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
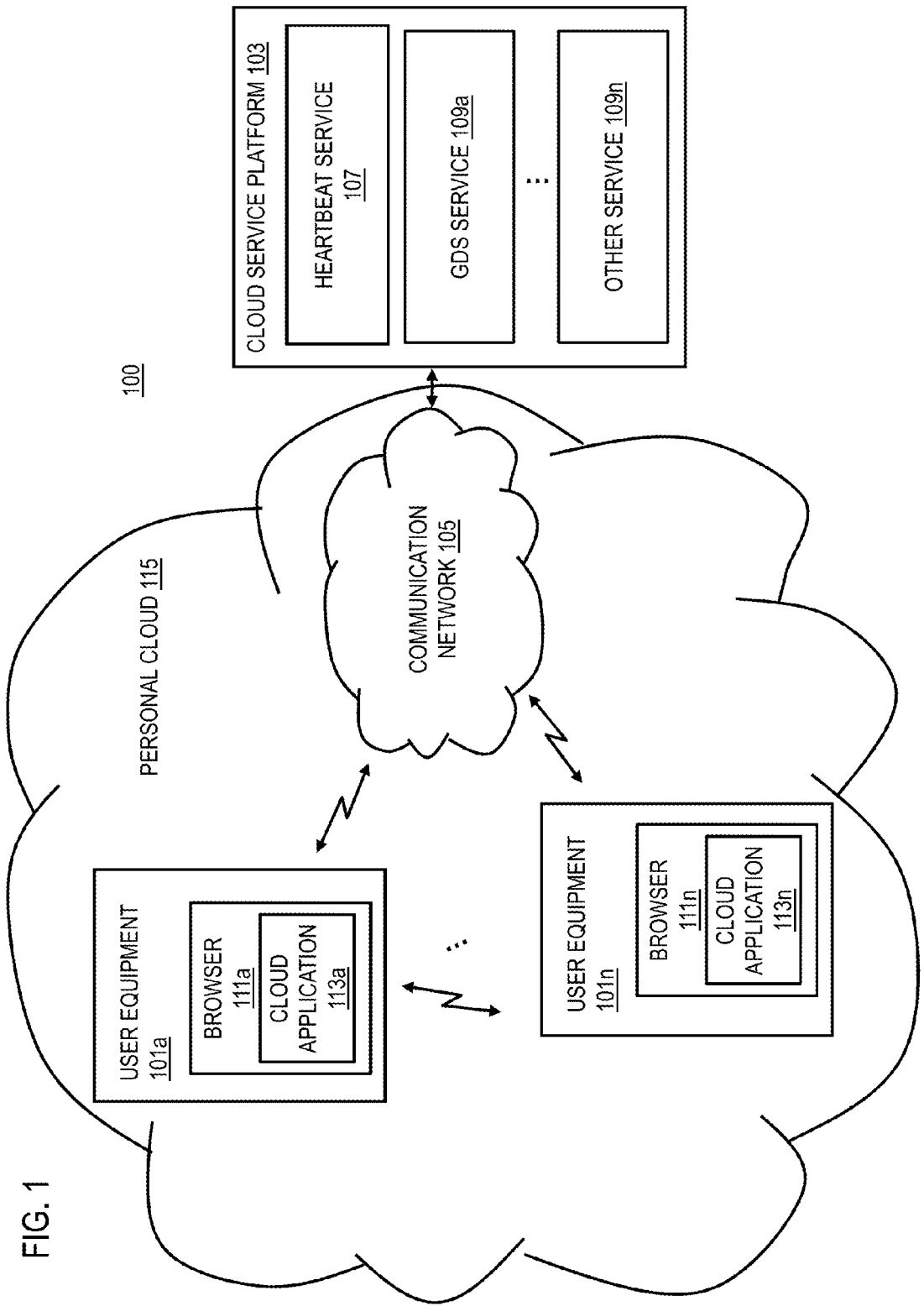
FIG. 1 is a diagram of a system capable of establishing one or more communication sessions in a cloud computing environment and maintaining the establishment of the one or more communication sessions while managing system resource and power resource consumption, according to one example embodiment.

FIG. 1 is a diagram of a system capable of establishing one or more communication sessions in a cloud computing environment and maintaining the establishment of the one or more communication sessions while managing system resource and power resource consumption, according to one example embodiment. Cloud computing services are web type services that allow for access to various contents and files through a browser or dedicated client application, for example. The content and files may reside on many different devices or servers. Any such devices may be, for example, mobile devices such as phones, tablets, music players, still and video cameras, computers, or any other storage device or data access device. A cloud computing environment may enable access to content and files, intelligent awareness and handling of changing bandwidth conditions, intelligent awareness of client capabilities to properly serve content for consumption, intelligent caching for offline usage, and any future Internet based services from any mobile or immobile device. For example, a cloud service on a mobile phone may offer content and files, as well as Internet services like location based services, peer-to-peer commerce transactions, check-ins, etc.

Conventional cloud computing services may establish communication sessions between devices, but may fail to maintain these communication sessions, or if they do maintain the communication sessions, do so while consuming massive amounts of system resources, power and network bandwidth.

To address this problem, a system 100 of FIG. 1 introduces the capability to establish one or more communication sessions in a cloud computing environment and maintain the establishment of the one or more communication sessions while managing system resource, bandwidth and power resource consumption.

As shown in FIG. 1, the system 100 comprises a user equipment (UE) 101a-101n, hereinafter referred collectively as UE 101 having connectivity to a cloud service platform 103 via a communication network 105. The UE 101 communicate with other UE 101's, and the cloud service platform 103 that provides a heartbeat service 107 and any service applications 109a-109n, hereinafter collectively referred to as service application 109 by way of a browser application 111a-111n, hereinafter collectively referred to as browser 111 and/or a cloud application 113a-113n, hereinafter collectively referred to as cloud application 113.

In a cloud computing environment, any network-enabled devices, i.e. devices such as UE 101's having connectivity to the communication network 105 in an individual's personal cloud are considered peers of each other. A personal cloud 115 is created by a user adding supported network-enabled devices, e.g. UE 101's such as, for example, mobile phones, tablets, computers, cameras, music players, etc. to their personal cloud 115 by way of the cloud application 113.

According to various embodiments, the cloud application 113 may communicate with various services such as a global directory service (GDS) 109 and/or a heartbeat service associated with the heartbeat service 107. When a UE 101 connects to the Internet, or to any of the personal cloud 115 associated UE 101's by way of the communication network 105, it may establish a network connection with the heartbeat service 107 and register itself with the GDS service 109. The UE 101 may keep the connection alive using the heartbeat service 107 by way of keep-alive messages that are optimized for low power and extremely low network utilization.

In one or more embodiments, each UE 101 that is part of the personal cloud 115 may communicate to one another directly (aka direct peer-to-peer communication or Direct-P2P) or fall back to any cloud computing service provided proxy service to talk to one another indirectly (aka proxy-based peer-to-peer communication or Proxy-P2P). The network connection that is established between any and all of the UE 101's associated with the personal cloud 115 may be maintained between each UE 101's by way of the heartbeat service 107, which may be sourced at a heartbeat server or as part of the cloud service platform 103, so long as any UE 101 with which a communication session has been established (i.e., a connection to the cloud service platform 103) has a network connection. The state of this network connection is maintained at the GDS 109. If this network connection is severed, the state of the network is updated at the GDS 109.

According to various embodiments, any network connection between UE 101's that are part associated with the personal cloud 115 may communicate directly to one another, or by way of a proxy such as through an alternative device, server or cloud service platform 103 in a bi-directional communication (2-way communication), or any multi-directional communication (n-way communication). As will be discussed in more detail below, 2-way and n-way communication sessions may be established in any number of combinations of ways between the various components of the system 100.

In a case where a 2-way communication session is established, the connection provides a 2-way notification bus between any of the UE 101's associated with the personal cloud 115 and the heartbeat service 107. In a first leg of the 2-way communication, a notification may be sent by sending a notification to a UE 101. When any application of any UE 101 such as the browser 111 or the cloud application 113, for example, initiates the sending of a notification to another UE 101 using the heartbeat service 107, the heartbeat service 107 may communicate to the notifying application 111 or 113, in this example, whether the destination UE 101 is connected with the cloud service platform 103 and, if connected, send the notification and confirm whether delivery of the notification is successful with the notifying application 111 or 113. In a second leg of the 2-way notification, the UE 101 sends one or more notifications to listeners. Listeners may be any application on another UE 101 that may have subscribed to notifications from a particular UE 101 through the cloud service platform 103 generally, or the heartbeat service 107 specifically, by connecting to the cloud service platform 103 and specifying which events on the UE 101 the other UE 101's are interested in. Such events may be, for example, one or more of an incoming network request, an outgoing network request, a response message, a timed event, and a keep-alive request. The request may be passed from heartbeat service, for example, to the listening, i.e. subscribed, UE 101, and when a interested event occurs, the UE 101 that is the subject of the subscription sends a notification that the event has occurred back to heartbeat service 107, which then sends the notification to the subscribed UE 101 having the application that originated the subscription.

In a case where one UE 101 establishes a Direct-P2P connection with another UE 101, a 2-way notification bus is established directly without the aid of the heartbeat service 107.

In a case where N-way group communication sessions are established to convey notifications, any number of applications 113 or UE 101's can request and establish 2-way notifications through the heartbeat service 107, and any number of UE 101's can request and establish 2-way notifications with one another if they are associated with the personal cloud 115 directly using Direct-P2P. Once established, the requestor cloud application 113 may notify all subscribers directly via Direct-P2P or through the heartbeat service 107 for applications accessing the personal cloud 115 through the heartbeat service 107. The same 2-way channel may also be used to send various actions to the each UE 101 in the personal cloud 115. Each UE 101 can specify what actions are allowed from another UE 101 in the personal cloud via various selectable access controls. For example, one UE 101a may allow another UE 101b on the personal cloud to have read/write access to memory on the UE 101a.

According to various embodiments, action types between UE 101's associated with the personal cloud 115 may include full creative retrieve update (CRUD) operations. For example, the various operation may include add data to another UE 101, get data from another UE 101, update data on another UE 101, remove data on another UE 101, etc.

According to various embodiments, the cloud service platform 103 may initiate an asynchronous request from a web-client to any cloud application 113, or from any cloud application 113 to any other cloud application 113. In the mobile world there have been various methods deployed for initiating and/or maintaining a connection for sending any requests or communications between devices and/or applications including SMS, long-polling or maintaining a heartbeat session between the nodes (i.e. the devices associated with the cloud service and/or the heartbeat server, etc). A cost effective method for maintaining an established communication session between devices associated with a cloud service is by way of a heartbeat signal between the any connected cloud service and/or application and any cloud application associated with one or more devices that are associated with the cloud service.

In one or more embodiments, the heartbeat service 107 generates a heartbeat signal that may be optimized such that the heartbeat signal acts to maintain an established communication session between any of the UE 101's, the heartbeat service, the cloud service platform 103, etc. such that the maintenance has a low power footprint on the UE 101's, has a low consumption of bandwidth and/or data usage over the communication network 105, as well as not be tolling on system resources of the various UE 101's between which the heartbeat signal in conveyed.

In one or more embodiments, a connection between one or more cloud applications 113 and other cloud applications 113, browsers 111, heartbeat service 107, cloud service platform 103 and one or more services 109 may be done through any proprietary connection protocol that may be similar to HTTP, or non-proprietary network protocol that is HTTP, or similar, for example. If the network where the cloud application 113 is running is going through an HTTP proxy, such as a conventional corporate network, then the protocol may revert from any proprietary protocol (or non-proprietary protocol that is similar to HTTP) to an HTTP compliant protocol. Accordingly, any heartbeat services 107 may have to also "listen" to standard HTTP and HTTPS TCP/IP network ports to determine to maintain an established communication session. Further, any of the UE 101 and/or the cloud service platform 103 may communicate to one another by way of Bluetooth or other short range radio, cellular or wireless network or WiFi means, for example.

According to various embodiments, in order to minimize system resource and power costs, and the need for re-connection attempts, any established communication session between any of the cloud applications 113 and/or UE 101's associated with the personal cloud 115 may be kept alive by the maintenance heartbeat signal managed by the heartbeat service 107, as discussed above, which then allows for the following:

At the system level, a cloud application 113 activation may be event based such that notifications are sent only at the occurrence of an event that may be subscribed to by any UE 101 or cloud application 113 associated with the personal cloud 115. The notification, in this example, is not scheduled for communication through the cloud service unless there is an event occurrence such as incoming/outgoing network request/response, timed events such as keep-alive requests, etc.

At the socket level, a TCP keep-alive signal may be set on the socket level, but because conventional TCP keep-alive implementations are not frequent enough to be reliable, one or more customizable iterations of the TCP keep-alive signal may be established. For example, a first iteration of keep-alive requests may have a maximum payload of 10 bytes up and down. Then, a next successor iteration of keep-alive requests may perform a TCP handshake that mimics standard TCP keep-alive requests/responses. This lowers network bandwidth as well as power utilization on conventional cell modems because of switching between power states. In addition, in the second iteration, frequency of keep-alive requests may start, for example, with a 50 second default based on a global minimum frequency data that is provided by a cloud service provider. It should be noted that the values discussed above are merely exemplary and the payload and time intervals of the keep-alive signals may be of any size or magnitude that optimally manages the power consumption, system resources and bandwidth/data usage of the various UE 101's associated with the cloud service based on any preferences or protocols set by any cloud service provider.

If the established connection is a compliant HTTP protocol, then an HTTP connection header may be set to a status such as "Keep-Alive" to inform an HTTP proxy that the connection will be kept up as long as possible. The keep-alive requests, in this example, may have a payload so that a proxy server will continue honoring the HTTP Keep-Alive status.

As discussed above, according to various embodiments, to maintain a connection between any of the UE 101's associated with the personal cloud 115, the frequency of the heartbeat will may be set to start at a slow pace such as one heartbeat signal every five minutes, and then if the connection gets dropped the heartbeat service will calculate how long the connection was idle before being dropped, and send heartbeat signals faster to ensure that a next connection will not be dropped. However, there is a chance that the heartbeat service may itself drop the connection because of a failure on the cloud service platform 103 side. As such, the cloud application 113 will try to lower the frequency of connection attempts to determine the source of the dropped connection by testing if the connection drop was because of a cloud service platform 103-side error, or the communication network 105 in between.

It is also possible that any network connections might be dropped because of administrative functions, or failure on UE 101's or other administrative policies. Under these circumstances, the cloud application 113 may need to reconnect the heartbeat service 107 as soon as possible. However, the cloud application 113 and/or the cloud service platform 103 may manage the frequency of reconnects so as to not trigger concerns regarding the maintainers of these networks. Further, in view of various UE 101 resource limits, communication network 105 limitations, and power limitations, the heartbeat service 107 and/or the cloud service platform 103 may consider all of this information when optimizing the frequency of reconnects and/or the sending of heartbeat signals.

In one or more embodiments, when a web request is communicated to the cloud service platform 103, the heartbeat signal connection that is established between the cloud service platform 103 and a cloud application 113 may be used to send commands to any UE 101's associated with the cloud application 113, and any responses to the commands may also be received on this connection. If, in this example, the heartbeat signal/connection is dropped, any commands that are not sent, or lack a successful report notification, are queued, and upon re-establishment of the heartbeat signal, the queued commands may get pushed out on the heartbeat connection. In this example, the commands are pushed out of the queue based on a predefined priority. The priority in this example is calculated as follows: oldest query first within the last 60 seconds and anything older than 60 seconds is dropped from the queue and may not be sent.

By way of example, the UE 101's and the cloud service platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, near field communication (NFC), satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
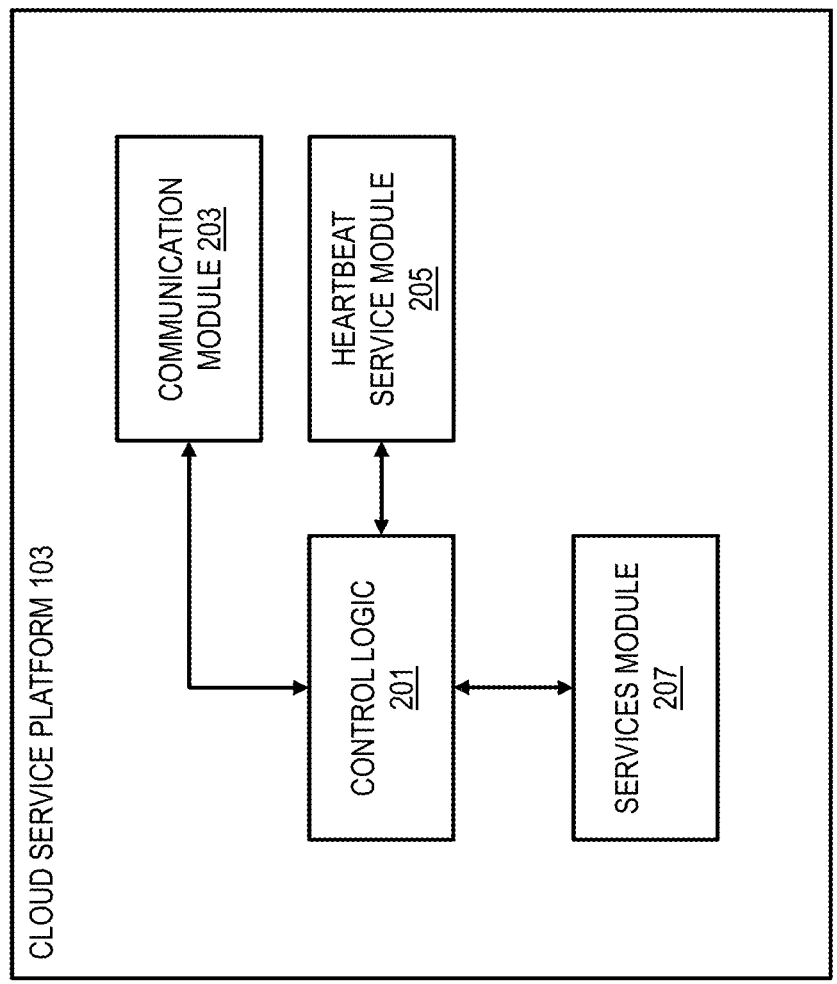
FIG. 2 is a diagram of the components of a cloud service platform, according to one example embodiment.

FIG. 2 is a diagram of the components of the cloud service platform 103, according to one example embodiment. By way of example, the cloud service platform 103 includes one or more components for providing establishing one or more communication sessions in a cloud computing environment and maintaining the establishment of the one or more communication sessions while managing system resource and power resource consumption. It is contemplated that the functions of these components may be combined in one or more components or performed by other components of equivalent functionality. In this embodiment, the cloud service platform 103 includes a control logic 201, a communication module 203, a heartbeat service module 205 and a services module 207.

In one or more embodiments, the cloud service platform 103 receives an indication that one or more UE 101's are establishing a personal cloud 115 by way of their respective cloud application s 113. The control logic 201 commands the services module 207 which may control a GDS service as discussed above for registering the personal cloud 115. The cloud service platform 103 then enables one or more communication sessions to be established between the one or more UE 101's and the cloud service platform 103 itself. The cloud service platform 103 then, by way of the control logic 201 then maintains any of the established communication sessions by commanding the heartbeat service module that controls the heartbeat service 107 to convey heartbeat signals at a predetermined and/or optimized frequency to maintain the one or more established communication sessions while considering power usage/availability of the various UE 101's, network usage and/or available system resources of the various UE 101's. The cloud service platform 103 may determine all of this information by periodically communicating with the UE 101's to fish for the information by way of the communication module 203. The periodicity of the fishing for system information may be a preset interval, or it may be customizable based on a user preference.

The cloud service platform 103 facilitates the conveyance of notification messages to any of the UE 101's and/or the cloud applications 113 based on any event subscription, direct messaging, or other event or scheduled communication and provides a successful notification message to indicating a successful sending of a notification to an intended recipient UE 101 or cloud application 113 by way of the communication module 203.

The cloud service platform 103, in conjunction with any of the cloud applications 113 and the service module 207 determine if any of the communication sessions have been dropped and appropriately queue any commands and/or messages and/or responses upon detection of a ceased communication session and cause the commands, messages and/or response to be conveyed upon re-establishment of the various communication sessions in order of an established priority, such as age of the command with respect to one another, within a predetermined threshold such as not being older than 60 seconds.

Figure 7:
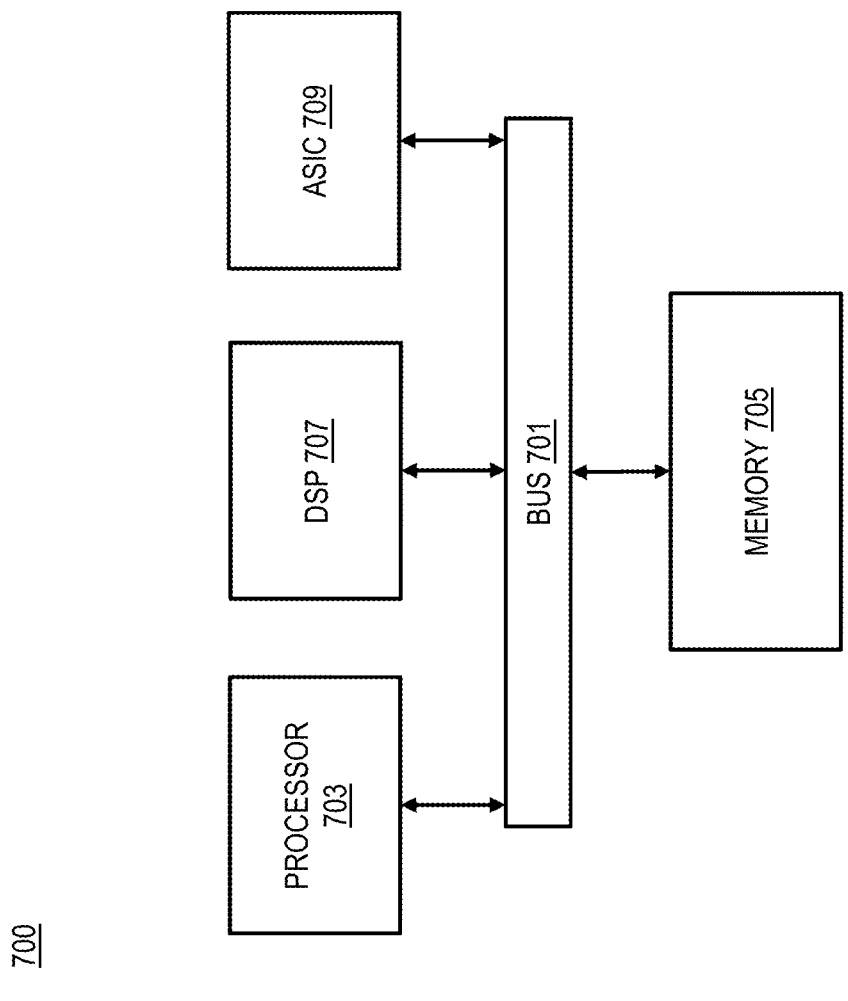
FIG. 7 is a diagram of a chip set that can be used to implement an example embodiment of the invention.

FIG. 3 is a flowchart of a process for establishing one or more communication sessions in a cloud computing environment and maintaining the establishment of the one or more communication sessions while managing system resource and power resource consumption, according to one example embodiment. In one embodiment, the cloud service platform 103 performs the process 300 and is implemented in, for instance, a chip set including a processor and a memory as shown in FIG. 7. In step 301, the cloud service platform 103 causes, at least in part, an establishment of one or more communication sessions between at least one device and one or more other devices, wherein the communication sessions convey, at least in part, one or more notification messages. Then, in step 303, the cloud service platform 103 processes and/or facilitates a processing of device resource information, device capability information, network resource information, or a combination thereof to determine one or more parameters for generating one or more heartbeat signals to maintain the one or more communication sessions. The one or more communication sessions may support bi-directional communications, multi-directional communications, or a combination thereof between the at least one device and the one or more other devices. Next, in step 305, the cloud service platform 103 determines the one or more notification messages to be successful.

The process continues to step 307 in which the cloud service platform 103 causes, at least in part, a confirmation of successful delivery of the one or more notification messages to be conveyed to one or more of the at least one device and the one or more other devices. Then, in step 309, the cloud service platform 103 causes, at least in part, a subscription to the one or more notification messages by way of another application. Then, in step 311, the cloud service platform 103 determines one or more events upon which the establishment of the one or more communication sessions is based. The determination of the one or more events causes, at least in part, an application configured to establish the one or more communication sessions to be activated. The one or more notifications may be delivered to the another application based, at least in part, on a determination of the conveyance of the one or more notification messages and the subscription. Next, in step 313, the cloud service platform 103 causes, at least in part, a confirmation of successful delivery of the one or more notification messages to be conveyed to one or more of the at least one device and the one or more other devices.

According to various embodiments, the one or more events are one or more of an incoming network request, an outgoing network request, a response message, a timed event, and a keep-alive request. Also, to limit system resource consumption, the cloud service platform 103 may control a first iteration of the keep-alive request to have a maximum payload of a predetermined number of bytes up and down such as 10 bytes, for example, and the first iteration of the keep-alive request occurs at a predetermined time interval. Further, a next iteration of the keep-alive request is by way of a TCP handshake, and the next iteration of the keep-alive request occurs at another predetermined time as determined by the cloud service platform 103 to be any time period that optimally conserves system resources such as an interval of 60 seconds, for example.

The process continues to step 315 in which the cloud service platform 103 causes, at least in part, the one or more heartbeat signals to occur at a first time interval. Then, in step 317, the cloud service platform 103 determines one or more of the established one or more communication sessions have ceased. Upon determination that the one or more of the established one or more communication sessions have ceased, the process continues to step 319 in which the cloud service platform 103 causes, at least in part, the one or more heartbeat signals to occur at a second time interval that is different from the first time interval. The difference may be greater than the first time interval or less than the first time interval based, at least in part, on an estimated determination of why the communication session was dropped.

The process continues to step 321 in which the cloud service platform 103 determines one or more available communication networks. Then, in step 323, the cloud service platform 103 determines one or more estimated power consumption values for the one or more communication sessions conducted over the one or more available communication networks. Next, in step 325, the cloud service platform causes, at least in part, a ranking of the one or more estimated power consumption values in order of magnitude. Then, so as to optimize the power consumption for maintain a communication session, the cloud service platform 103 causes, at least in part, the one or more communication sessions to be established over the communication network having the lowest magnitude of estimated power consumption.

In a case in which the one or more heartbeat signals communicate one or more commands to the at least one of the at least one device and the one or more other devices, and the one or more heartbeat signals communicate one or more responses to the one or more commands, the process continues to step 327 in which the cloud service platform 103 determines one or more of the one or more heartbeat signals have ceased. Then, in step 329, the cloud service platform 103 causes the one or more commands to be queued and ranked based on a predetermined priority. Next, in step 331, the cloud service platform 103 causes, at least in part, the one or more commands to be communicated in order of the ranking upon re-establishment of the one or more heartbeat signals. Then, in step 333, the cloud service platform 103 causes, at least in part, deletion of one or more of the commands determined to be in the queue for a period of time greater than a threshold value.

FIGS. 4a-4f illustrate a series of example sequence diagrams that depict N-way group notification subsets of which (when there are 2 nodes) are 2-way notifications, according to one example embodiment. For example, a web browser 111 through proxy service and a UE 101a communicating with a UE 101b through proxy service, and a UE 101c communicating with the UE 101b.

Figure 4A:
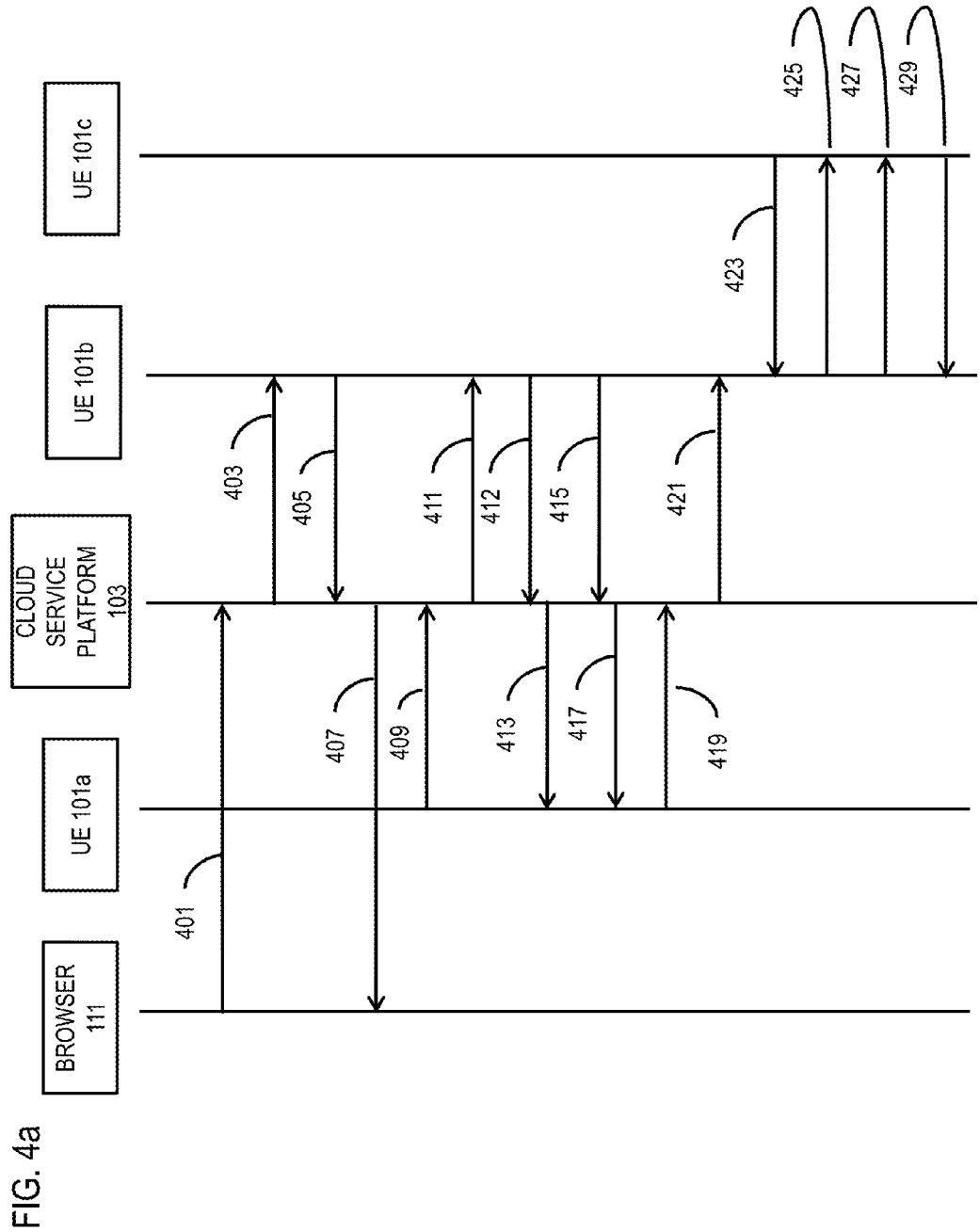

FIG. 4a illustrates a series of subscription events to types of events and actions. At step 401, the browser 111 subscribes via proxy by way of the cloud service platform 103 to the UE 101b for event types "a" and "c." Then, in step 403, the cloud service platform 103 subscribes the browser 111 to event types "a" and "c" with the UE 101b by communicating a message to the UE 101b. The UE 101b, in step 405 conveys a success message communication back to the cloud service platform 103 indicating that actions "x" and "y" are allowed. Then, in step 407, the cloud service platform 103 relays the success notification to the browser 111 indicating that actions "x" and "y" are allowed.

Next, in step 409, the UE 101 subscribes, via proxy, to the UE 101b for events "b" and "c" by sending a subscription message to the cloud service platform 103. The cloud service platform 103, in step 411, sends a message to the UE 101b indicating a subscription to event "b" because the cloud service platform has already subscribed to events "a" and "c" based on the subscription made on account of the browser 111. Then, in step 412, the UE 101b returns a success message to the cloud service platform 103 indicating allowed access permissions for actions "x," "y" and "z." The cloud service platform 103, in step 413, then relays the success message to the UE 101a indicating the subscription was a success and allowed actions "x," "y" and "z."

Then, in step 415, the UE 101b sends a subscription message to the UE 101a by way of the cloud service platform 103 acting as a proxy indicating a subscription to event types "b" and "c." In step 417, the cloud service platform 103 sends a subscription message for UE 101b to UE 101a indication a subscription request for event types "b" and "c." The UE 101a, in step 419 returns a success message to the cloud service platform 103 indicating success and allowed actions "x," "y" and "z." The cloud service platform 103, in step 421 sends a success message indicating that the subscription was successful and that actions "x," "y" and "z" are allowed.

Steps 423-429 illustrate direct communication between UE 101b and UE 101c. The cloud service platform 103 is extraneous to these communications. Communications between UE 101a and UE 101c may be by way of any wireless or wired connection such as Bluetooth, WiFi, or TCP/IP, for example.

In step 423, the UE 101c sends a direct P2P subscription message to the UE 101b indicating a subscription to event types "b" and "c." In step 425, UE 101b sends a success message indicating that the subscription was successful and that actions "x," "y" and "z" are allowed. Then, in step 427, the UE 101b sends a direct P2P subscription message to UE 101c subscribing to event type "a." In step 429, the UE 101c sends a success message to UE 101b indicating that the subscription request was successful and that actions "x," "y" and "z" are allowed.

Figure 4B:
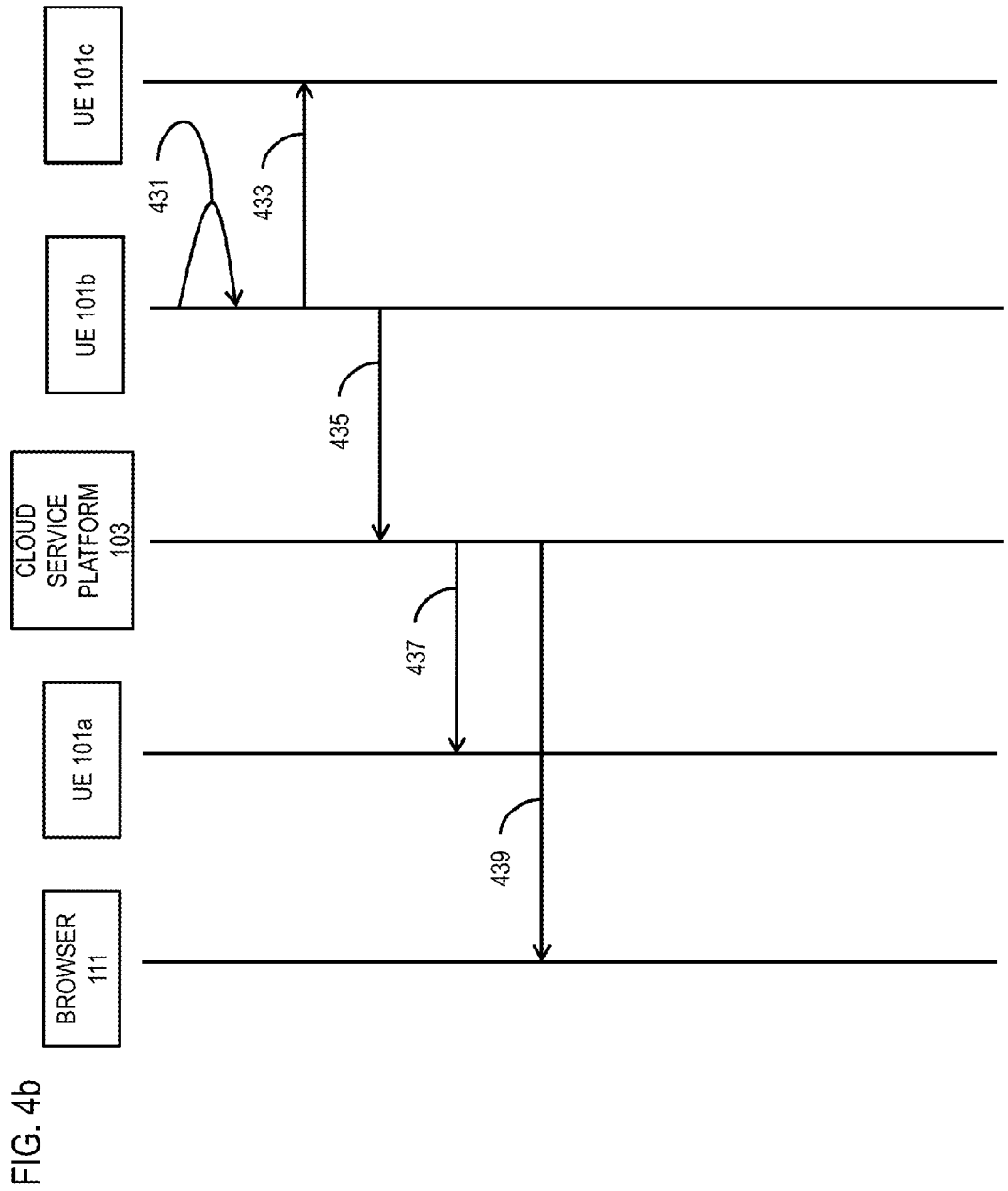

FIG. 4b illustrates a sequence diagram of messages that occur based on event type "c" at UE 101b. At step 431 an event type "c" occurs at UE 101b. Then, in step 433, UE 101b sends a notification message to UE 101c that event type "c" has occurred. In step 435, UE 101b sends a notification message to the cloud service platform 103 indicating that event type "c" occurred. The cloud service platform, in step 437, sends a notification message to UE 101a indicating that event type "c" occurred at UE 101b. Then, in step 439, cloud service platform 103 sends a notification message to browser 111 indicating that event type "c" occurred at UE 101b. It should be noted that steps 437 and 439 may occur independently or simultaneously.

Figure 4C:
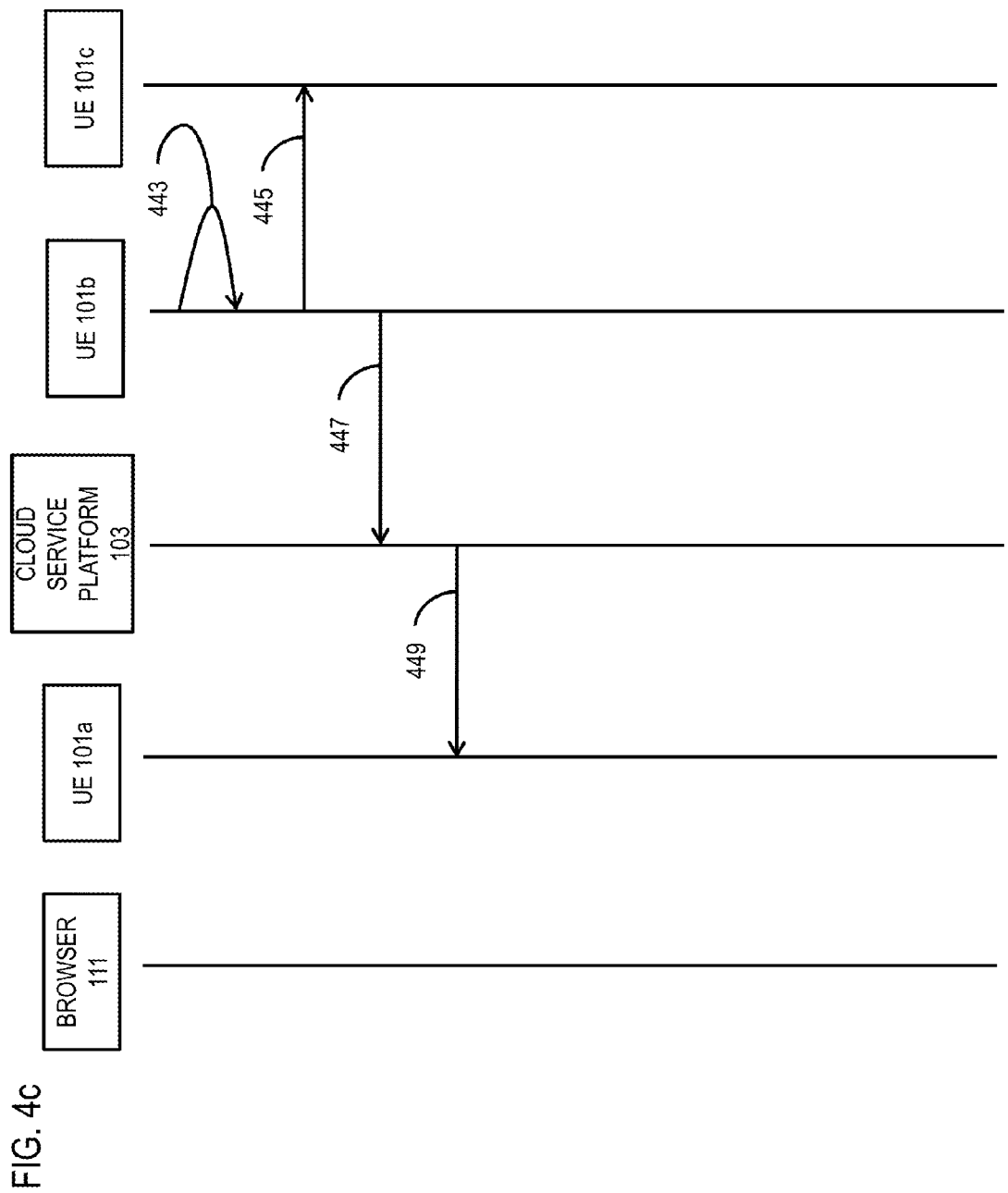

FIG. 4c illustrates a sequence diagram of messages that occur based on event type "b" at UE 101b. At step 443 an event type "b" occurs at UE 101b. Then, in step 445, UE 101b sends a notification message to UE 101c that event type "b" has occurred. In step 447, UE 101b sends a notification message to the cloud service platform 103 indicating that event type "b" occurred. The cloud service platform, in step 449, sends a notification message to UE 101*a* indicating that event type "b" occurred at UE 101*b*.

FIG. 4*d* illustrates a sequence diagram that indicates UE 101*a* performs an action "x." At step 451, UE 101*a* performs an action "x," which may be, for example, viewing content available at UE 101*b*, and the access has been triggered based on the occurrence of event "c." In step 453, a notification message that UE 101*a* is conducting action "x," or the action "x" itself, is sent to the cloud service platform 103. Then, in step 455, the cloud service platform 103 relays the notification or the action "x" itself to the UE 101*b*.

FIG. 4*e* illustrates a sequence diagram indicating the occurrence of an event type "b" at UE 101*a*. In step 457, an event type "b" occurs at UE 101*a*. Then, in step 459, a notification message is sent to the cloud service platform 103 indicating that event type "b" occurred at UE 101*a*. Next, in step 461, cloud service platform 103 sends a notification message to UE 101*b* indicating that event type "b" occurred at UE 101*a*.

FIG. 4*f* illustrates a sequence diagram of an event type "a" that occurs at UE 101*c*. In step 463 event type "a" occurs at UE 101*c*. UE 101*c*, in step 465, then sends a notification message directly to UE 101*b* indicating that event type "c" occurred.

FIGS. 5*a* and 5*b* illustrate a series of user interfaces for cloud applications 113 available on UE 101*a* and UE 101*b*, as discussed above. In this example embodiment, a user may view photos on UE 101*b* from a user interface on UE 101*a* by way of the personal cloud 115 discussed above.

In FIG. 5*a*, the UE 101*a* has a user interface 501 for a cloud application 113. UE 101*b* has a user interface 503 for its cloud application 113, and a photo album 505. A user of UE 101*a* may want to subscribe to the photo album 505 because, in this example, a photo album 509 on the UE 101*a* is empty. The user may choose an available device that is registered as being part of the personal cloud 115 by selecting a chosen device available through a user interface and selecting the subscribe button 507. The subscribe button 507 may initiate a subscription to an event such as any time UE 101*b* takes a new picture, the photos available in the photo album 505 will appear in the photo album 509. In this example, the photo album 505 illustrates two pictures. When UE 101*b* takes a picture, there will be more than two pictures, indicating that the subscribed to even has occurred.

Upon receipt of the subscription request, a user of UE 101*b* (which may be the same or a different user), may have an option to decide to allow the subscription request, or a setting may be selected such that a device that is associated with the personal cloud 115 is always trusted. Before allowing, or any time thereafter, a user may set particular access privileges in a camera preferences menu 513, for example. In this example, a default setting may be set to enable read/write access to the photo album 505 from the UE 101*a*. Upon allowing the subscription, a success message is sent back to the UE 101*a*, and the subscribe button changes to a success indication, or some other means for conveying the success notification may be displayed.

FIG. 5*b* illustrates UE's 101*a* and 101*b* having user interfaces 501 and 503. The photo albums 505 and 509 now illustrate three pictures. In this example a picture was taken by UE 101*b* and the photo album 509 was further populated with another picture. This event triggered a notification to the UE 101*a* and enabled the photo album 505 to have access to the pictures available in photo album 509. Based on the action rights that were given to UE 101*a*, a user may select the review/edit button 515 to enable selection of a photo available in the photo album 509. In the cloud environment, if the user edits the photo album 509, the changes will be reflected in photo album 505. Such action rights are why actions may be limited by a device that is the source of the subscribed to event. For instance, if a user only wants to have viewing rights from the photo album 509 and not full edit rights, such access rights may be blocked so as to preserve the integrity of the content available in the photo album 505.

Of course the subscriptions to events, data content that is available, messages, access rights, or any other preference setting may be applicable to any form of content such as video content, audio content, textual content, etc. Action rights may be any of read access, write access, no access, etc.

The processes described herein for establishing one or more communication sessions in a cloud computing environment and maintaining the establishment of the one or more communication sessions while managing system resource and power resource consumption may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
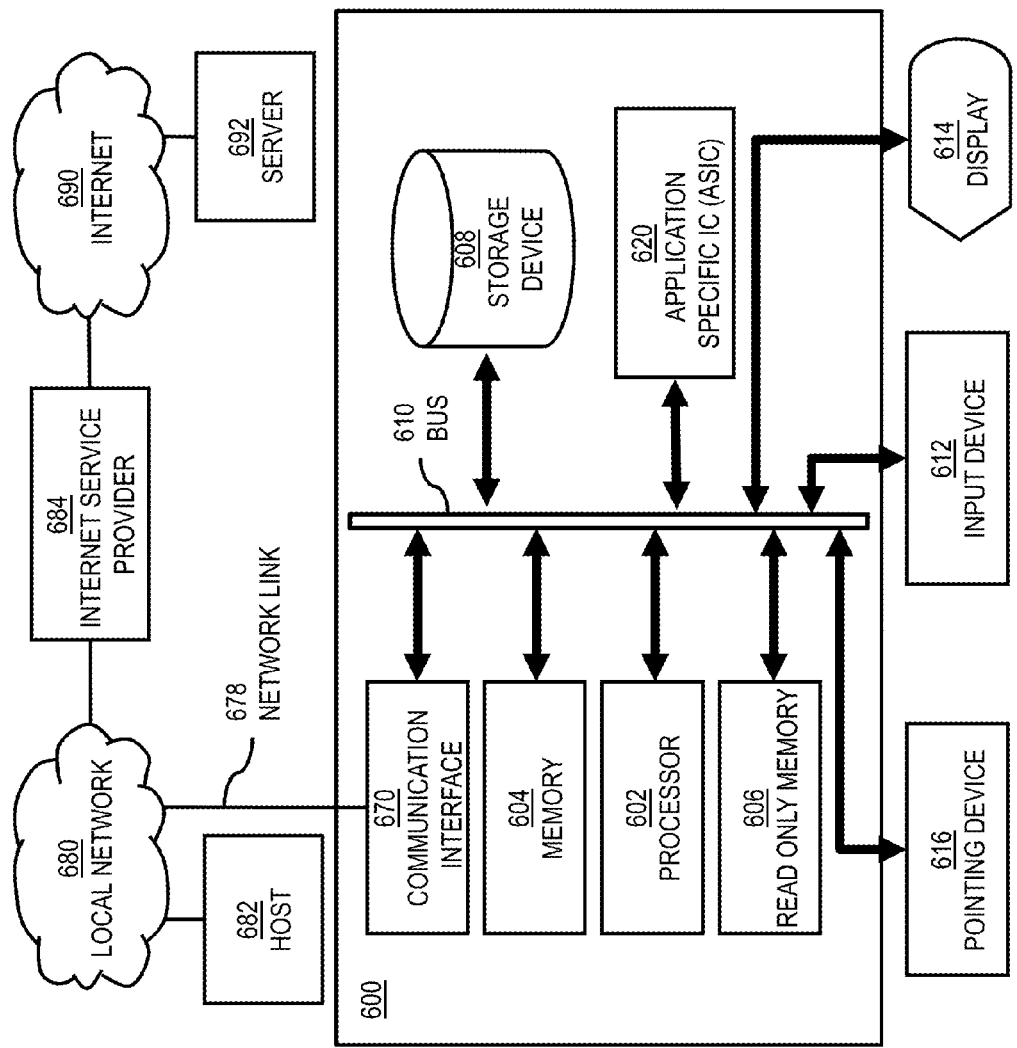
FIG. 6 is a diagram of hardware that can be used to implement an example embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to establish one or more communication sessions in a cloud computing environment and maintaining the establishment of the one or more communication sessions while managing system resource and power resource consumption as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of establishing one or more communication sessions in a cloud computing environment and maintaining the establishment of the one or more communication sessions while managing system resource and power resource consumption.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to establish one or more communication sessions in a cloud computing environment and maintaining the establishment of the one or more communication sessions while managing system resource and power resource consumption. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for establishing one or more communication sessions in a cloud computing environment and maintaining the establishment of the one or more communication sessions while managing system resource and power resource consumption. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for establishing one or more communication sessions in a cloud computing environment and maintaining the establishment of the one or more communication sessions while managing system resource and power resource consumption, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for establishing one or more communication sessions in a cloud computing environment and maintaining the establishment of the one or more communication sessions while managing system resource and power resource consumption to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to establish one or more communication sessions in a cloud computing environment and maintaining the establishment of the one or more communication sessions while managing system resource and power resource consumption as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of establishing one or more communication sessions in a cloud computing environment and maintaining the establishment of the one or more communication sessions while managing system resource and power resource consumption.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to establish one or more communication sessions in a cloud computing environment and maintaining the establishment of the one or more communication sessions while managing system resource and power resource consumption. The memory 705 also stores the data associated with or generated by the execution of the inventive steps.

Figure 8:
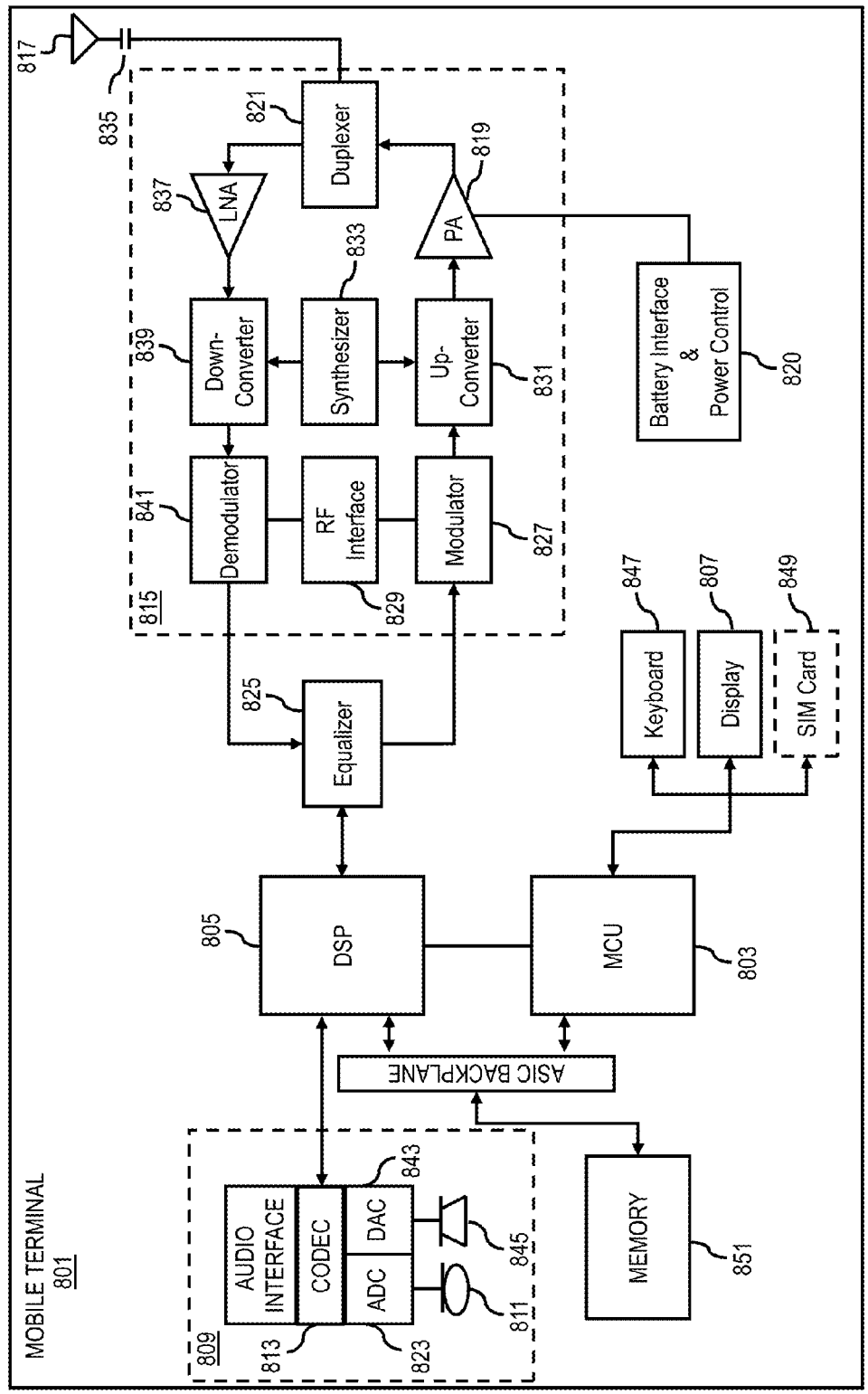
FIG. 8 is a diagram of a mobile terminal (e.g., handset) that can be used to implement an example embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of establishing one or more communication sessions in a cloud computing environment and maintaining the establishment of the one or more communication sessions while managing system resource and power resource consumption. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of establishing one or more communication sessions in a cloud computing environment and maintaining the establishment of the one or more communication sessions while managing system resource and power resource consumption. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to establish one or more communication sessions in a cloud computing environment and maintaining the establishment of the one or more communication sessions while managing system resource and power resource consumption. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method, comprising:

determining one or more events upon which an establishment of one or more communication sessions over a network between at least one user device and one or more other user devices is based, wherein the communication sessions convey, at least in part, one or more notification messages of the one or more events, wherein the one or more events include a subscription by the one or more other user devices to media objects captured by the at least one user device, and one or more edits on the media objects made by the one or more other user devices;

determining the one or more notification messages to be successful;

confirming successful delivery of the one or more notification messages to the at least one user device and the one or more other user devices;

processing device resource information, device capability information, network resource information, or a combination thereof to determine one or more parameters for generating one or more heartbeat signals to maintain the established one or more communication sessions; and causing a first iteration of a keep-alive request at a first frequency and a next iteration of the keep-alive request at a second frequency that is lower than the first frequency to reduce a network utilization, wherein the confirmation of successful delivery of the one or more notification messages is based on the one or more events.

2. A method of claim 1, further comprising:

increasing a frequency of the one or more heartbeat signals when the one or more communication sessions get dropped, wherein the one or more communication sessions support bi-directional communications, multi-directional communications, or a combination thereof between the at least one user device and the one or more other devices.

3. A method of claim 2, further comprising:

determining one or more available communication networks;

determining one or more estimated power consumption values for the one or more communication sessions conducted over the one or more available communication networks;

ranking the one or more estimated power consumption values in order of magnitude; and establishing the one or more communication sessions over the communication network having the lowest magnitude of estimated power consumption, wherein the one or more communication sessions get dropped due to one or more failures on a cloud service platform, on one or more administrative functions, on one or more administrative policies.

4. A method of claim 1, further comprising:
when the media objects are taken and placed in a source media object folder shown a user interface of the at least one user device, causing a population of the media objects in one or more other media object folders shown on one or more other user interfaces of the one or more other user devices; and
in response to a write access to the media objects shown in the one or more other media object folders, reflecting the write access to the media objects is shown in the source media object folder,
wherein the one or more notification messages are triggered by occurrence of the one or more events, and the determination of the one or more events causes, at least in part, a first application configured to establish the one or more communication sessions to be activated.

5. A method of claim 4, further comprising:
subscribing to the one or more notification messages by way of a second application; and
delivering the one or more notifications to the second application based, at least in part, on a determination of the conveyance of the one or more notification messages and the subscription.

6. A method of claim 4, wherein the one or more events further include one or more of an incoming network request, an outgoing network request, a response message, a timed event, or a combination thereof.

7. A method of claim 6, wherein the first iteration of the keep-alive request has a maximum payload of a predetermined number of bytes up and down.

8. A method of claim 7, wherein the next iteration of the keep-alive request is by way of a Transmission Control Protocol (TCP) handshake.

9. A method of claim 4, further comprising:
in response to the population, a notification of the media objects in the one or more other media object folders for one or more users of the one or more other user devices to access.

10. A method of claim 1, further comprising:
determining an occurrence of the one or more heartbeat signals at a first time interval;
determining that one or more of the established one or more communication sessions have ceased; and
determining an occurrence of the one or more heartbeat signals at a second time interval that is greater in frequency than the first time interval.

11. A method of claim 1, further comprising:
determining an occurrence of the one or more heartbeat signals at a first time interval;
determining that one or more of the established one or more communication sessions have ceased; and
determining an occurrence of the one or more heartbeat signals at a second interval that lesser in frequency than the first time interval.

12. A method of claim 1, wherein the one or more heartbeat signals communicate one or more commands to the at least one of the at least one user device and the one or more other user devices, and the one or more heartbeat signals communicate one or more responses to the one or more commands, the method further comprising:
determining that one or more of the one or more heartbeat signals have ceased;
queuing and ranking one or more commands based on a predetermined priority;
communicating the one or more commands in order of the ranking upon re-establishment of the one or more heartbeat signals; and
deleting one or more of the commands determined to be in the queue for a period of time greater than a threshold value.

13. A method of claim 1, wherein the second frequency is a value based on a global minimum frequency data.

14. A method of claim 1, wherein the events start the one or more communication sessions, the communication sessions being asynchronous.

15. An apparatus comprising:
at least one processor; and
at least one memory including computer program code for one or more programs,
the at least one memory and the computer program code configured to, with the at least one processor, cause the apparatus to perform at least the following,
cause, at least in part, at least one determination of one or more events upon which an establishment of one or more communication sessions over a network between at least one user device and one or more other user devices is based, wherein the communication sessions convey, at least in part, one or more notification messages of the one or more events, wherein the one or more events include a subscription by the one or more other user device to media objects captured by the at least one user device, and one or more edits on the media objects made by the one or more other user devices;
determine the one or more notification messages to be successful;
cause, at least in part, a confirmation of successful delivery of the one or more notification messages to the at least one user device and the one or more other user devices;
process device resource information, device capability information, network resource information, or a combination thereof to determine one or more parameters for generating one or more heartbeat signals to maintain the established one or more communication sessions; and
cause a first iteration of a keep-alive request at a first frequency and a next iteration of the keep-alive request at a second frequency that is lower than the first frequency to reduce a network utilization,
wherein the confirmation of successful delivery of the one or more notification message is based on the one or more events.

16. An apparatus of claim 15, wherein the apparatus is further caused to:
determine one or more events upon which the establishment of the one or more communication sessions is based,
wherein the determination of the one or more events causes, at least in part, a first application configured to establish the one or more communication sessions to be activated.

17. An apparatus of claim 16, wherein the apparatus is further caused to:
cause, at least in part, a subscription to the one or more notification messages by way of a second application; and
cause, at least in part, the one or more notifications to be delivered to the second application based, at least in part, on a determination of the conveyance of the one or more notification messages and the subscription.

18. An apparatus of claim 15, wherein the apparatus is further caused to:
cause, at least in part, the one or more heartbeat signals to occur at a first time interval;
determine one or more of the established one or more communication sessions have ceased; and
cause, at least in part, the one or more heartbeat signals to occur at a second time interval that is greater in frequency than the first time interval.

* * * * *